(No Model.)

J. H. McLEAN.

BEARING FOR JOURNALS.

No. 309,241. Patented Dec. 16, 1884.

Witnesses:
J. Henry Schmidt
Chas. E. Metz

Inventor:
James Henry McLean, M.D.
per Chas. F. Meisner
Att'y

N. PETERS. Photo-Lithographer, Washington, D. C.

UNITED STATES PATENT OFFICE.

JAMES HENRY McLEAN, OF ST. LOUIS, MISSOURI.

BEARING FOR JOURNALS.

SPECIFICATION forming part of Letters Patent No. 309,241, dated December 16, 1884.

Application filed May 5, 1884. (No model.)

*To all whom it may concern:*

Be it known that I, JAMES HENRY McLEAN, of the city of St. Louis, in the State of Missouri, have invented a new and useful Improvement in Bearings for Car-Axles and the like Journals, of which the following is a specification.

This invention is an improvement on a former patent for car-journals and bearings granted to me February 3, 1880, No. 224,205, and specially relates to the bearing itself.

The improvements consist in filling the slots and inner face of the bearing with glass, Babbitt metal, lead, or any other metal; also, in the new and novel method of accomplishing the filling.

In order to fully describe my invention, and to enable others to fully understand the same, reference is had to the accompanying drawings, in which—

Figure 1:
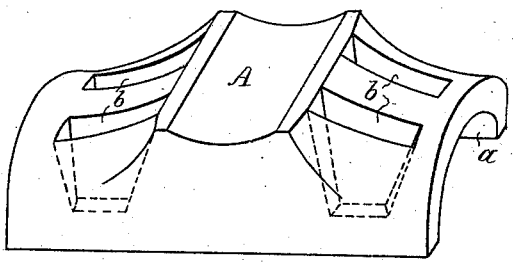
Figure 2:
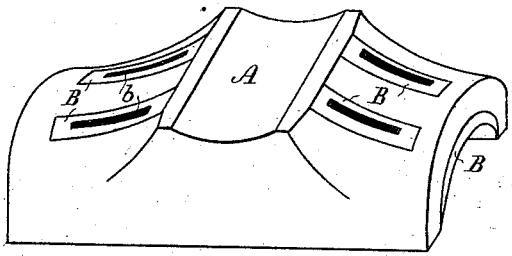
Figure 3:
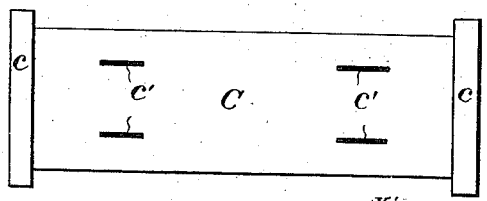
Figure 4:
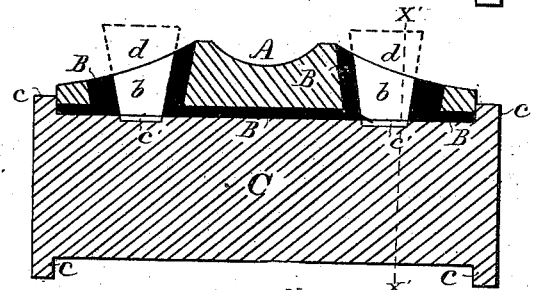
Figure 5:
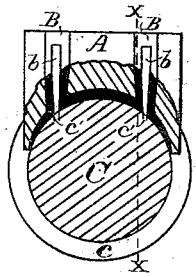
Figure 6:
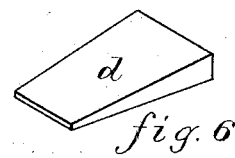

Figure 1 is a perspective view of my bearing without the filling. Fig. 2 is a similar view of my bearing complete. Fig. 3 is a top plan of the mandrel or core. Fig. 4 is a longitudinal section on line $x$ $x$ of Fig. 5. Fig. 5 is a cross-section on line $x'$ $x'$ of Fig. 4. Fig. 6 is a perspective view of one of the wedges.

A represents the bearing, which may be made of any suitable metal; $a$, its inner face; $b$ $b$ $b$, the vertical slots which in my above-mentioned patent formed the reservoirs for the oil.

The great difficulty in the old method consisted in not being able to make the slots small enough, thus greatly weakening the bearing, which difficulty I now by my improved method successfully overcome, being able to reduce said slots down to any required size, whereby the strength and durability of the bearing is not reduced, and the advantage of making the bearing itself in iron, brass, or any other metal is achieved.

B is the filling or lining, which may be made of glass, Babbitt metal, lead, or any other metal, which I cast or pour into the slots and on the inner face of the bearing A in the following-described new and novel manner.

C is a core or mandrel, which may be of iron, wood, or other suitable material, partly around which the bearing A fits, leaving a space between the outer face of the mandrel and the inner face of the bearing for the filling.

$c$ are flanges at each end of the mandrel, which close up the ends of the space just described by extending up along each end of the bearing clearly seen in Fig. 4. The slots $b$ $b$ of the bearing I now form so that all four sides of each slot are inclined inwardly from top to bottom, thus making the opening at the bottom of the slots smaller than at the top, whereby the metal or glass which is filled in is held in place and prevented from falling through. The mandrel or core C has small grooves or slits, $c'$, into which wedges $d$ $d$ are placed and held in upright position while the filling is poured in. These wedges $d$ $d$, when placed in the slots $c'$, extend up and through the slots $b$, leaving a space around them on all sides for the filling B, which wedges $d$ $d$, after the filling is completed, are withdrawn, leaving small slots of the size and shape of the wedges. These wedges $d$ $d$ are made tapering, with all their sides from top to bottom, (see Fig. 6,) for the purpose of facilitating their withdrawal, and thus leaving the slots longer and wider at the top than at the bottom, to allow the free escape of any grit, sand, or other cutting substances from the top of the journal when in use.

By making my slotted bearing so as to have a filling or lining, the bearing-surface is enlarged and the slots are made smaller, thus adding material and body, and consequent strength and durability to the bearing, the slots still serving as oil-reservoirs and passages for the escape of any grit or the like substances.

I am aware that bearings have been provided with a lining or filling before, and that a lining within a bearing is old; but

What I claim is—

1. A slotted bearing having its slots inclined inwardly from top to bottom, for the purpose of holding a filling or lining in place, as set forth.

2. A slotted bearing, A, provided with a filling or lining on its inner face, $a$, and within the slots $b$, as and for the purpose set forth.

3. The core or mandrel C, provided with slits or grooves $c'$ and flanges $c$, and wedges $d$, in combination with the slotted bearing A, as herein shown and described, and for the purpose set forth.

JAMES HENRY McLEAN.

Witnesses:
JAS. MILLAN,
CHAS. F. MEISNER.